United States Patent [19]
Jones

[11] Patent Number: 6,104,352
[45] Date of Patent: Aug. 15, 2000

[54] REMOTE TESTING AND MONITORING APPARATUS FOR USE WITH ANTENNA REFLECTOR DEICING SYSTEMS

[75] Inventor: Thaddeus M. Jones, Bremen, Ind.

[73] Assignee: MSX, Inc., South Bend, Ind.

[21] Appl. No.: 09/188,068

[22] Filed: Nov. 6, 1998

Related U.S. Application Data

[63] Continuation-in-part of application No. 09/008,770, Jan. 19, 1998.

[51] Int. Cl.$^7$ ...................................................... H01Q 1/02
[52] U.S. Cl. ........................... 343/704; 219/213; 392/422
[58] Field of Search ........................... 343/704; 219/213; 392/422, 426, 424; H01Q 1/02

[56] References Cited

U.S. PATENT DOCUMENTS

| | | | |
|---|---|---|---|
| 5,617,107 | 4/1997 | Fleming | 343/704 |
| 5,729,238 | 3/1998 | Walton, Jr. | 343/704 |
| 5,861,855 | 1/1999 | Arsenault et al. | 343/704 |

*Primary Examiner*—Hoanganh Le
*Attorney, Agent, or Firm*—Taylor & Aust, P.C.

[57] ABSTRACT

An antenna reflector assembly includes a reflector having a reflecting surface and an electrical heater having a first terminal and a second terminal. The electrical heater is configured for heating the reflecting surface. A remote monitor and test device is disposed at a location remote from the reflector. The remote monitor and test device is configured for being connected to a source of electrical power. The remote monitor and test device includes a line voltage node electrically connected to the first terminal of the heater, and one of a neutral node and a ground node electrically connected to the second terminal of the heater. A ground fault circuit interrupter is configured for detecting a ground fault condition and cutting off an electrical current associated with the ground fault condition. A current sensor is configured for detecting an electrical current exceeding a predetermined current level and transmitting a signal indicative thereof. A current indicator is configured for receiving the signal from the current sensor and providing an indication thereof. A voltage indicator is configured for sensing a voltage and providing an indication thereof.

20 Claims, 4 Drawing Sheets

REMOTE TESTING AND MONITORING APPARATUS FOR USE WITH ANTENNA REFLECTOR DEICING SYSTEMS

This is a continuation-in-part of U.S. patent application Ser. No. 09/008,770, entitled "METHOD AND APPARATUS FOR USING DIRECT CURRENT TO DETECT GROUND FAULTS IN A SHIELDED HEATER WIRE", filed Jan. 19, 1998.

BACKGROUND OF THE INVENTION

1. Field of the Invention

The present invention relates to an apparatus for testing and monitoring of electric heaters, and, more particularly, to an apparatus for testing and monitoring of electric heaters used to melt and thus remove snow and ice from pavement, roofs, gutters, down spouts, satellite dishes and the like.

2. Description of the Related Art

Electric heaters may be utilized to supply heat used in snow and ice melting systems. Typical melting applications include but are not limited to satellite dishes, roofs and gutters, pavement, building and garage entrances and facilities accommodating the physically challenged. Efficient operation requires embedding the electric heaters in or attaching the electric heaters to satellite dishes, pavement and other structures which may sometimes become covered with snow and ice.

Snow and ice melting systems commonly employ automatic ON/OFF controls that operate heaters only while required to minimize energy consumption and operating costs. Typically, the automatic ON/OFF controls sense ambient moisture and temperature. However, it is also possible for the automatic ON/OFF control to be in the form of a thermostat which only senses ambient temperature. Heaters operate at ambient temperatures below a threshold—usually 38° F. while ambient moisture is present and for a period of time thereafter to clear accumulated snow and ice. Optionally, the automatic ON/OFF control may inhibit heater operation at temperatures too low for effective melting, e.g., below 17° F. Status indicators and a manual control and test switch are typically included in the same package with such automatic ON/OFF controls.

In order to reduce costs and simplify installation, it is known to attach the automatic ON/OFF control package to the support structure of a satellite dish antenna, or "reflector". A problem with attaching the control package to the support structure of a reflector is that it requires access to the reflector in order to observe the status indicators and to test deicing system performance with the manual control and test switch. Since the reflector must be placed within the line of sight of the associated satellite for reliable communications, the reflector must almost always be placed at an elevated location, such as on a rooftop or a pole. Thus, nearly all antenna locations are not easily accessible for purposes of observing and testing deicing system performance.

In a known method of attaching the control package to the support structure of a reflector, a hole is drilled in a support arm thereof. Using the drilled hole, a bracket is bolted to the support arm of the reflector, and the control package is attached to the bracket. A problem is that this is a cumbersome process that requires specialized tools.

Moreover, in many retail applications, frequent relocation of the reflector is required. While the reflector itself is typically not relocated because it would not be cost effective to do so, it is cost effective to transfer the automatic ON/OFF control package along with the associated wiring to the new reflector location. A problem is that the cumbersome process of attaching the control package must be repeated at the new reflector location. An additional problem is that the bolt securing the control package to the first reflector may be rusty from exposure to the elements, making its removal extremely difficult.

Ground current is the difference between the outbound and return heater currents. The U.S. National Electric Code requires using a ground fault circuit interrupter (GFCI) on all snow and ice melting circuits. The GFCI interrupts heater current if the ground current exceeds a predetermined limit; usually 30 milliamperes. The GFCI requires manual reset after tripping. This preserves safety by not restarting heater operation during intermittent ground leakage current that may occur in wet locations.

Independent of the heater fabrication method, ground current can flow due to a heater failure caused by a manufacturing defect, corrosion, wear and tear or mechanical damage. Excessive ground current causes the dual safety problems of fire and shock hazard. An electrical shock hazard can also occur whenever ground current flows since its path to earth ground is usually not predictable. Thus, a GFCI is required to be incorporated into snow and ice melting electrical circuits. It is known to install a residential GFCI in a knockout box convenient to the deicing system. A problem is that this task must be performed by an electrician, thereby adding to the cost of transferring the heater circuitry when a new reflector location is needed.

Until recently, reflectors have almost always measured at least 1.8 meters across for very small aperture terminal (VSAT) applications. These 1.8 meter reflectors require over 650 watts of deicing power, which is enough to justify the cost of automatic ON/OFF controls in most climates. Due to improvements in ground and space equipment, smaller antennas measuring no more than 1.2 meters across have become practical. These 1.2 meter reflectors require only approximately 250 watts of deicing power for the lower half of the reflector, which is not enough to justify the cost of automatic ON/OFF controls in most climates. Nevertheless, automatic ON/OFF controls are almost universally used with 1.2 meter reflectors because of the desirability of the status indicators and the manual control and test switch that are included in the same package as the automatic ON/OFF controls. Thus, a problem is that automatic ON/OFF controls are often used in applications in which their cost is not warranted.

What is needed in the art is a device for testing and monitoring the operation of a reflector deicing system that is conveniently accessible to operating personnel, can be easily transferred between reflector locations, and which does not require the use of expensive automatic ON/OFF controls.

SUMMARY OF THE INVENTION

The present invention provides a reflector deicing system monitor and test unit that is disposed remotely from the reflector at a location that is convenient for operating personnel to access. The monitor and test unit is secured at the remote location with quick fastening devices for easy installation and removal. The monitor and test unit is electrically connected to the heating unit of the reflector by a thermostat and a junction box. The thermostat and junction box are secured to the reflector with quick fastening devices for easy installation and removal.

The invention comprises, in one form thereof, an antenna reflector assembly including a reflector having a reflecting surface and an electrical heater having a first terminal and a second terminal. The electrical heater is configured for heating the reflecting surface. A remote monitor and test device is disposed at a location remote from the reflector. The remote monitor and test device is configured for being connected to a source of electrical power. The remote monitor and test device includes a line voltage node electrically connected to the first terminal of the heater, and one of a neutral node and a ground node electrically connected to the second terminal of the heater. A ground fault circuit interrupter is configured for detecting a ground fault condition and cutting off an electrical current associated with the ground fault condition. A current sensor is configured for detecting an electrical current exceeding a predetermined current level and transmitting a signal indicative thereof. A current indicator is configured for receiving the signal from the current sensor and providing an indication thereof. A voltage indicator is configured for sensing a voltage and providing an indication thereof.

An advantage of the present invention is that access to the reflector is not needed in order to observe deicing system status indicators and to test deicing system performance.

Another advantage is that testing and monitoring of the deicing system can be performed without the expense of an automatic ON/OFF control.

Yet another advantage is that the remote monitor and test unit, as well as the junction box and thermostat at the reflector, can be installed quickly, easily and without specialized tools. Also, these components can be quickly and easily removed and transferred to a new location, possibly a new reflector location, without specialized tools.

A further advantage is that the testing/monitoring and GFCI functions are combined together into a single remote monitor and test unit, thereby reducing cost and reducing complexity such that an electrician is not required.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
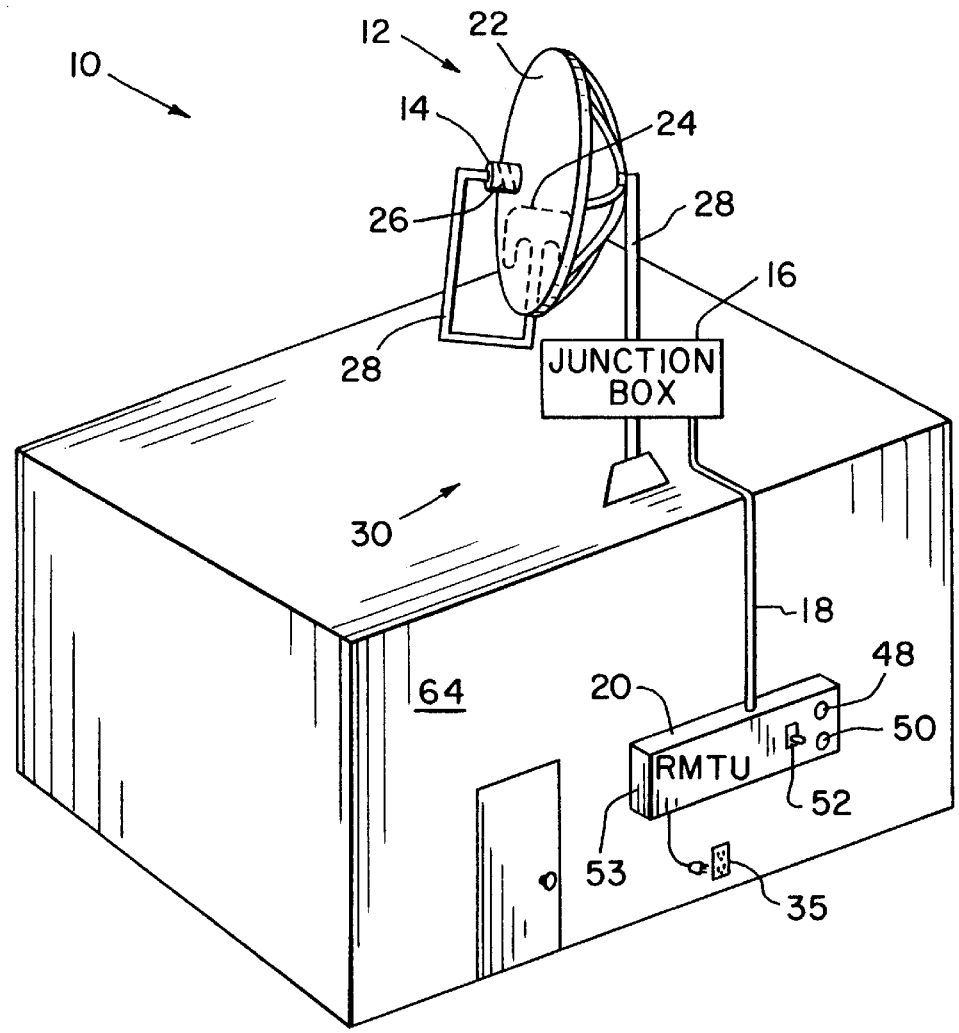
FIG. 1 is a perspective view of one embodiment of the antenna reflector deicing system of the present invention.

Referring now to the drawings and particularly to FIG. 1, there is shown a perspective view of an embodiment of an antenna reflector assembly 10 of the present invention. Antenna reflector assembly 10 generally includes reflector 12, feedhorn 14, junction box 16, multi-conductor cable 18 and remote monitor and test unit (RMTU) 20.

Reflector 12 includes a reflecting surface 22 having an electrical wire heater 24. Reflecting surface 22 can be a non-conductive plastic material, in which case heater 24 can be embedded therein. Reflective surface 22 can also be metal, in which case heater 24 can be taped or otherwise adhered to surface 22. Similarly, feedhorn 14 includes an electrical wire heater 26 connected in series with heater 24. Each of reflector 12 and feedhorn 14 is mounted upon a respective support arm 28 of a support structure 30.

Figure 3:
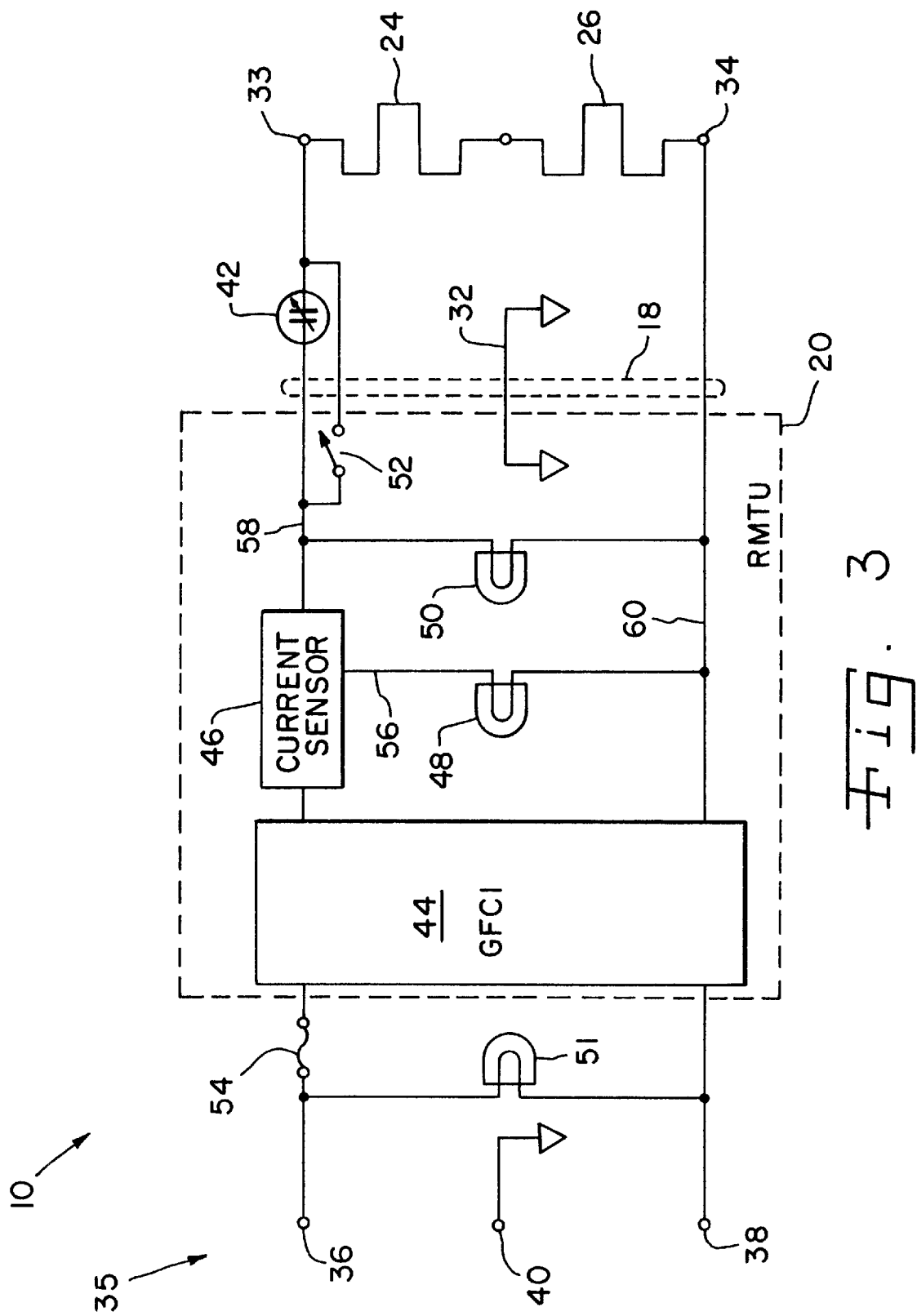
FIG. 3 is a schematic diagram of the antenna reflector deicing system of FIG. 1, including a thermostat.

Circuitry, including cable 18 and RMTU 20, for powering, monitoring and testing heaters 24 and 26 is shown schematically in FIG. 3. Each of heater wires 24 and 26, as well as cable 18, is surrounded by a grounded shield 32. Heater wires 24 and 26 include respective terminals 33 and 34. An electrical receptacle 35 functions as a source of electrical power and includes a line voltage terminal 36, a neutral terminal 38 and a ground terminal 40. Receptacle 35 supplies power to RMTU 18 and heaters 24, 26, which act as resistive heating elements. Although the wiring connections for 120 volt grounded neutral electric service are shown, any common worldwide utility voltage can be accommodated.

An automatic control element in the form of thermostat 42 is connected in series with heater 24. Thermostat 42 functions as a switch which closes when an ambient temperature falls below 40° F., thus applying electrical power to heaters 24, 26. Once having been closed, the contacts do not open until the temperature exceeds 50° F.

RMTU 20 includes a ground fault circuit interrupter (GFCI) 44, a current sensor 46, a current indicator 48, voltage indicators 50 and 51, and a test switch 52. All of these components are enclosed within a single housing 53.

An over-current device in the form of a fuse 54 protects RMTU 20 by disconnecting power if the current through fuse 54 exceeds a safe value. Fuse 54 would then need to be replaced before heaters 24, 26 could again be operated. A circuit breaker can be used in place of fuse 54. Such a circuit breaker would need to be reset before heaters 24, 26 could again be operated.

GFCI 44 detects ground fault conditions by comparing a line current in line voltage terminal 36 to a neutral current in neutral terminal 38. If the difference between the two currents exceeds 30 milliamperes, GFCI blocks current from flowing through voltage terminal 36 with an internal relay (not shown). Once GFCI 44 has been tripped, operating personnel must operate a reset switch (not shown) in order to cancel GFCI operation and allow power to be reapplied to heaters 24, 26. An indicator (not shown) may be provided to display GFCI operation.

Current sensor 46 detects the presence of a line current exceeding a threshold value, which indicates that heaters 24 and 26 are operating. This threshold value can be approximately 400 milliamperes for a reflector approximately between 1.0 and 1.2 meter in width. Upon detecting such a line current, current sensor 46 transmits a signal indicative thereof on line 56.

Status indicators including current indicator 48 and voltage indicator 50 provide status information for operating personnel. Current indicator 48 is in the form of a lamp which receives the signal from current sensor 46 on line 56 and emits visible light in response thereto. Operation of lamp 48 indicates that heaters 24, 26 are functioning.

Voltage indicator 50, for indicating that voltage is available for heaters 24, 26, is in the form of a lamp interconnecting a line voltage node 58 and a neutral node 60. When voltage is available for heaters 24, 26 at line voltage node 58, lamp 50 so indicates by emitting visible light. Lamp 50 limits the current flowing through itself to well below the threshold current, 400 milliamperes, of current sensor 46. Thus, current sensor 46 will not mistake operation of lamp 50 for operation of heaters 24, 26. Voltage indicator 51, also in the form of a lamp, indicates that receptacle 35 is supplying voltage.

In the particular embodiment shown, indicators 48, 50 and 51 are visible lamps, however light emitting diodes or audible indicators may be used as well. Other status indicators may be included to indicate temperature, the presence of snow, or a ground fault condition.

Test switch 52 is electrically connected in parallel with thermostat 42 in order to allow operating personnel to momentarily bypass thermostat 42 and thereby test heaters 24, 26 for a short period of time, even in the absence of cold temperatures and snow. The closing of switch 52 applies voltage to heaters 24, 26 and causes current indicator 48 to emit light, indicating that heaters 24, 26 are operational. Thus, the closing of test switch 52 simulates the closing of the contacts of thermostat 42, which would also apply voltage to heaters 24, 26. In addition, other switches may be provided for testing/resetting of the GFCI and for aborting heater operation.

As apparent from the foregoing description, the present invention combines the functions of testing and monitoring reflector heaters with ground fault circuit interruption in a single RMTU housing 53.

As best seen in FIG. 1, RMTU 20 is disposed at a location which is conveniently accessed by operating personnel. Such a location is necessarily remote from reflector 12, which must be placed on a rooftop or pole for best reception of airborne signals.

Figure 2:
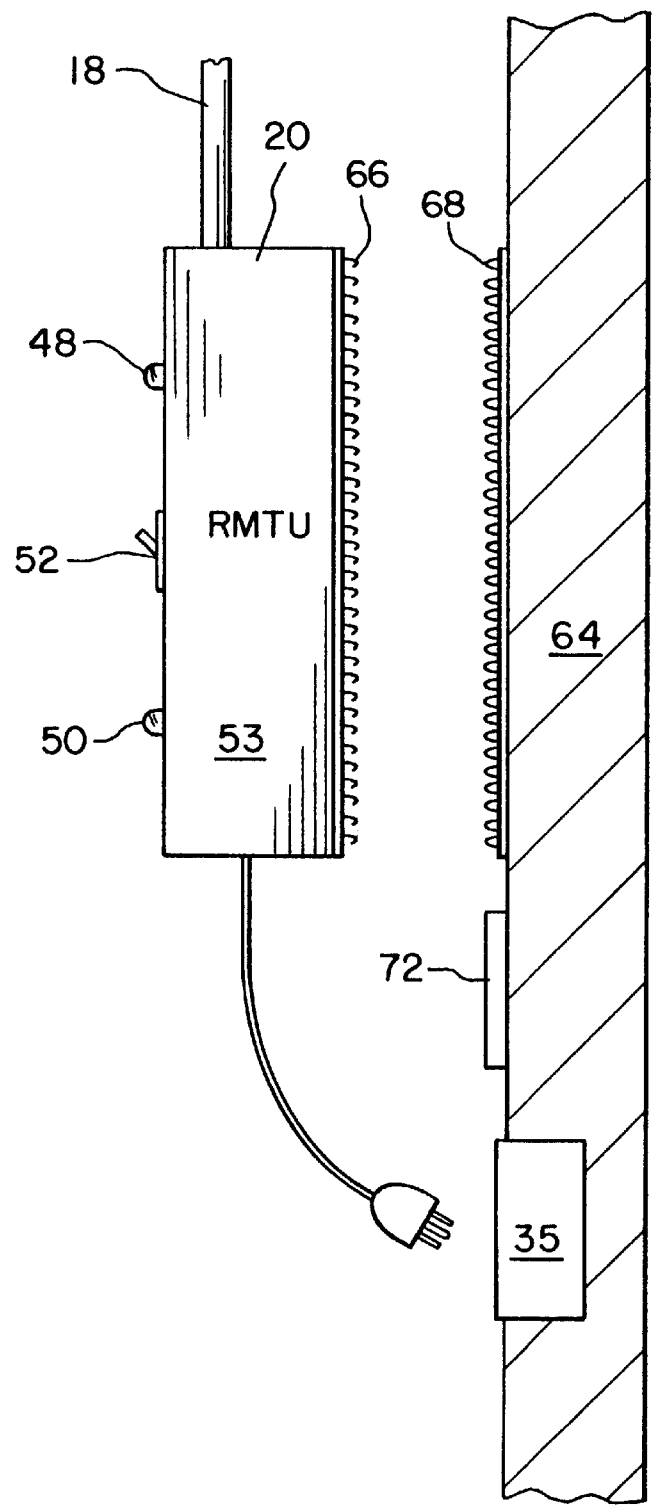
FIG. 2 is a side view of one embodiment of the remote monitor and test unit of the antenna reflector deicing system of FIG. 1, including a quick fastening device.

Housing 53 of RMTU 20 is secured to a wall 64 (FIG. 2) by a quick connect type of fastening device, which is shown in this embodiment as a Velcro® fastener including hooks 66 and loops 68. Of course, hooks 66 may also be placed on wall 64, with loops 68 being placed on RMTU housing 53.

An optional junction box 16 can be used to enclose and mechanically protect connection joints between cable 18, heater wires 24, 26 and, possibly, thermostat 42. Junction box 16 can be secured to one of support arms 28 by a hook and loop fastener in substantially the same manner that RMTU 20 is secured to wall 64. Thermostat 42 can either be attached to junction box 16 or secured to one of support arms 28 by another hook and loop fastener. Junction box 16 can also enclose connection joints for communication lines which transmit data to and from reflector 12 and feedhorn 14.

The use of quick connect fastening devices, such as hook and loop fasteners, to install RMTU 20, junction box 16 and thermostat 42 allows this heater circuitry to be easily removed and reinstalled at another reflector location if necessary. Of course, other types of quick connect fastening devices, such as a double-sided adhesive fastening device 72, can be used in place of hook and loop fasteners.

In an alternative embodiment (FIG. 4), thermostat 42 is replaced by another automatic control element, snow detector 74, which includes a microcontroller 76 (FIG. 5), an ambient temperature sensor and interface 78, and a moisture sensor and interface 80. It is to be understood that either thermostat 42, snow detector 74, or any other type of automatic control can be used in conjunction with the present invention.

The moisture sensor and interface 80 uses an on-board temperature regulated heater to convert snow and/or ice to liquid water. Water on the surface of a sensing grid is detected as a change in conductivity. An interface circuit incorporated within moisture sensor and interface 80 converts the conductivity change into a low-impedance analog signal which is transmitted to an electrical processor such as microcontroller 76 via conductor 82.

The ambient temperature sensor and interface 78 converts the ambient temperature sensor signal into an analog signal which is appropriate for inputting to the microcontroller 76 via a conductor 84. Electrical power is applied to heaters 24, 26 while moisture is present and the ambient temperature is in the operating range.

Figure 5:
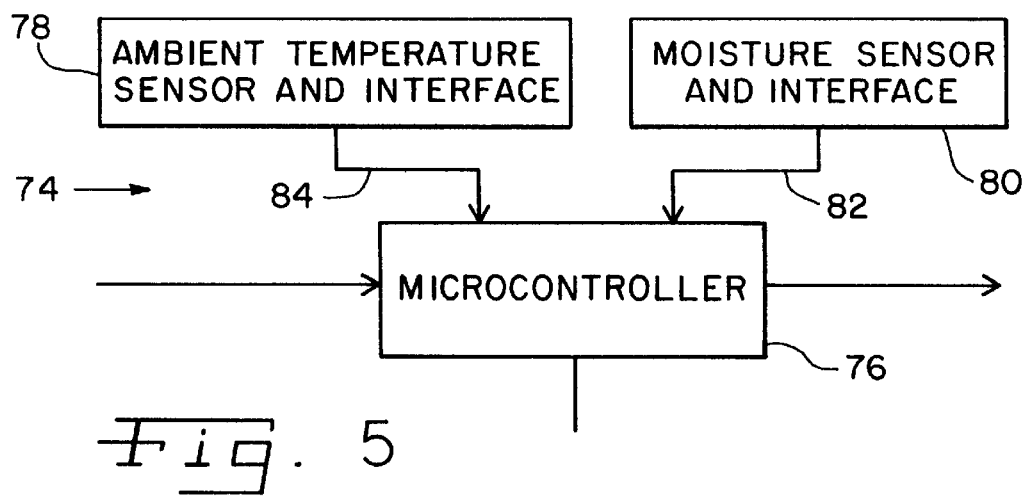
FIG. 5 is a block diagram of one embodiment of the snow detector of the antenna reflector deicing system of FIG. 4.

In the embodiment of snow detector 74 shown in FIG. 5, moisture sensor and interface 80 and ambient temperature sensor and interface 78 are shown as separate subsystems. However, it is also possible to combine moisture sensor and interface 80 and ambient temperature sensor and interface 78 into a single subsystem. An example of a single sensor which may combine the moisture sensing and ambient temperature sensing into a single unit is known, e.g., from a model CIT-1 Snow Sensor and a model GIT-1 Gutter Ice Sensor, each of which are manufactured by the Assignee of the present invention.

Figure 4:
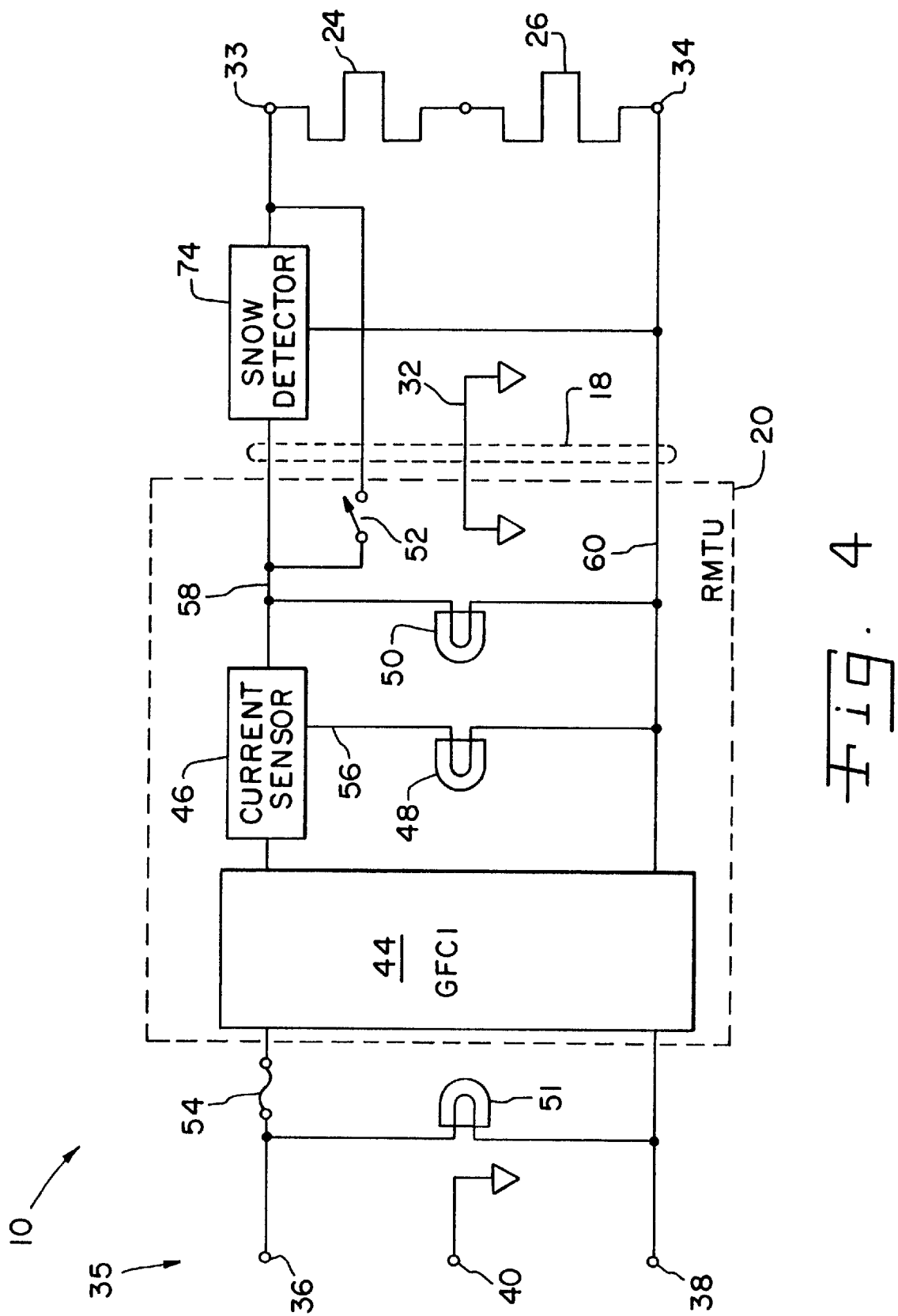
FIG. 4 is a schematic diagram of another embodiment of the antenna reflector deicing system of the present invention, including a snow detector.

In the embodiments shown in FIGS. 3 and 4, fuse 54, current sensor 46, test switch 52, thermostat 42 and snow detector 74 are all disposed on the line voltage side of heaters 24, 26. However, it is to be understood that any of these components can alternatively be placed on the neutral side of heaters 24, 26.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An antenna reflector assembly, comprising:
    a reflector having a reflecting surface;
    an electrical heater having a first terminal and a second terminal, said electrical heater being configured for heating said reflecting surface; and
    a remote monitor and test device disposed at a location remote from said reflector, said remote monitor and test device being configured for being connected to a source of electrical power, said remote monitor and test device including:
    a line voltage node electrically connected to said first terminal of said heater;
    one of a neutral node and a ground node electrically connected to said second terminal of said heater;
    a ground fault circuit interrupter configured for detecting a ground fault condition and cutting off an electrical current associated with said ground fault condition;
    a current sensor configured for detecting an electrical current exceeding a predetermined current level and transmitting a signal indicative thereof;
    a current indicator configured for receiving said signal from said current sensor and providing an indication thereof; and a voltage indicator configured for sensing a voltage and providing an indication thereof.

2. The antenna reflector assembly of claim 1, wherein said current indicator electrically interconnects said current sensor and said one of a neutral output node and a ground output node.

3. The antenna reflector assembly of claim 1, wherein said voltage indicator electrically interconnects said line voltage node and said one of a neutral node and a ground node to thereby sense a voltage at said line voltage node.

4. The antenna reflector assembly of claim 1, wherein said voltage indicator is configured to draw an indicator current, said indicator current being less than said predetermined current level.

5. The antenna reflector assembly of claim 1, further comprising:
a feedhorn associated with said reflector; and
a second electrical heater connected in series with said reflector heater, said second electrical heater being configured for heating said feedhorn.

6. The antenna reflector assembly of claim 1, further comprising an over-current protection device connected to said source of electrical power, said over-current protection device being configured for disconnecting said remote monitor and test device from said source of electrical power when a current through said over-current protection device exceeds a predetermined safe current level.

7. The antenna reflector assembly of claim 1, wherein said source of electrical power provides a line current and one of a neutral current and a ground current, said ground fault circuit interrupter being configured for comparing said line current to said one of a neutral current and a ground current.

8. The antenna reflector assembly of claim 1, wherein said heater is embedded in said reflecting surface.

9. The antenna reflector assembly of claim 1, wherein each of said current indicator and said voltage indicator comprises a light emitting device.

10. The antenna reflector assembly of claim 1, wherein said remote monitor and test device includes a test switch configured for selectively applying electrical power to said electrical heater, said antenna reflector assembly further comprising a thermostat configured for sensing temperature of an ambient atmosphere and applying electrical power to said heater when said ambient temperature falls below a first predetermined temperature.

11. The antenna reflector assembly of claim 10, wherein said thermostat and said test switch of said remote monitor and test device are connected in parallel.

12. The antenna reflector assembly of claim 10, further comprising a multi-conductor electrical cable interconnecting said remote monitor and test device with said thermostat and said electrical heater, said multi-conductor cable including a first conductor, a second conductor, a third conductor and a fourth conductor, said first conductor connecting one of said line voltage node and said neutral node of said remote monitor and test device to said thermostat, said second conductor connecting said test switch of said remote monitor and test device to one of said first terminal and said second terminal of said heater, said third conductor connecting an other of said line voltage node and said neutral node of said remote monitor and test device to an other of said first terminal and said second terminal of said heater, said fourth conductor comprising a grounded shield.

13. The antenna reflector assembly of claim 10, wherein said thermostat is configured for removing electrical power from said electrical heater when said ambient temperature rises above a second predetermined temperature, said second predetermined temperature being greater than said first predetermined temperature.

14. An antenna reflector assembly, comprising:
a reflector having a reflecting surface;
an electrical heater having an first terminal and a second terminal, said electrical heater being configured for heating said reflecting surface; and
a remote monitor and test device disposed at a location remote from said reflector, said remote monitor and test device being configured for being connected to a source of electrical power, said remote monitor and test device including a status indicator configured for providing at least one of an indication of an electrical current exceeding a predetermined current level and an indication of a voltage.

15. The antenna reflector assembly of claim 14, further comprising:
a snow detector configured for sensing temperature and moisture associated with an ambient environment and applying electrical power to said electrical heater when said ambient temperature is below a predetermined temperature and said ambient moisture is above a predetermined level; and
an electrical cable interconnecting said remote monitor and test device with said snow detector.

16. The antenna reflector assembly of claim 15, wherein said remote monitor and test device includes a test switch configured for selectively applying electrical power to said electrical heater.

17. The antenna reflector assembly of claim 15, wherein said snow detector includes:
a microcontroller;
an ambient temperature sensor electrically connected to said microcontroller; and
a moisture sensor electrically connected to said microcontroller.

18. An antenna reflector assembly, comprising:
a reflector subassembly including at least one of a reflecting surface and a feedhorn;
a support structure supporting said reflector subassembly;
an electrical heater configured for heating said at least one of a reflecting surface and a feedhorn;
at least one of a junction box and a thermostat electrically connected to said heater;
at least one first quick connect fastening device attaching said at least one of a junction box and a thermostat to one of said reflector subassembly and said support structure;
a remote monitor and test device disposed at a location remote from said reflector, said remote monitor and test device including a ground fault circuit interrupter;
a second quick connect fastening device configured for attaching said remote monitor and test device to a fixed structure; and
an electrical cable interconnecting said remote monitor and test device with at least one of said heater and said at least one of a junction box and a thermostat.

19. The antenna reflector assembly of claim 18, wherein at least one of said first quick connect fastening device and said second quick connect fastening device comprises a hook and loop fastener.

20. The antenna reflector assembly of claim 18, wherein at least one of said first quick connect fastening device and said second quick connect fastening device comprises an adhesive fastening device.

* * * * *